June 17, 1952 — C. O. BRUESTLE — 2,600,841
WIRE CLAMP AND CUTTER FOR SPOOLING MACHINES
Filed June 25, 1949 — 3 Sheets-Sheet 3
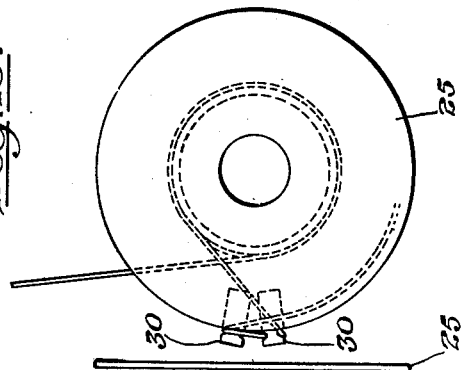
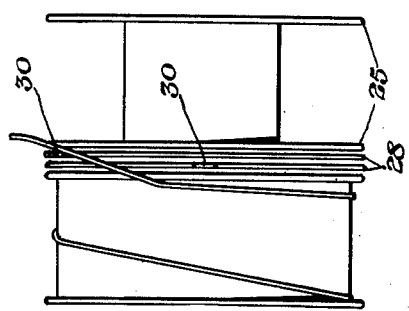
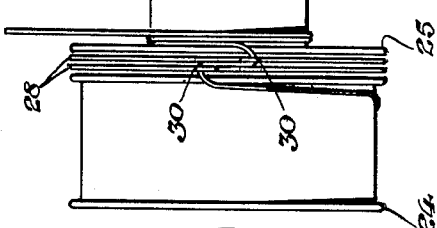
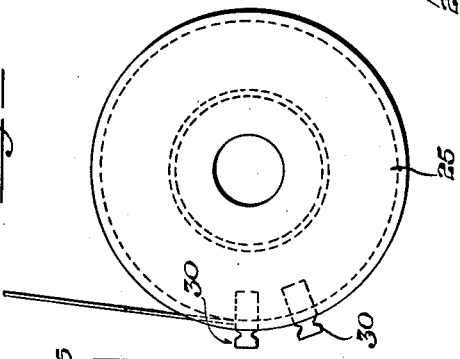
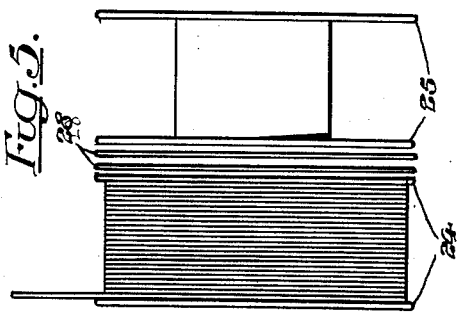
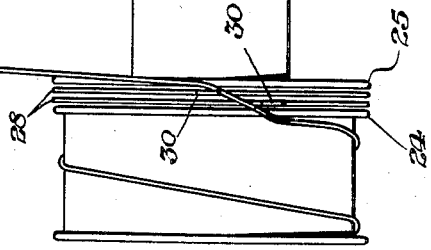
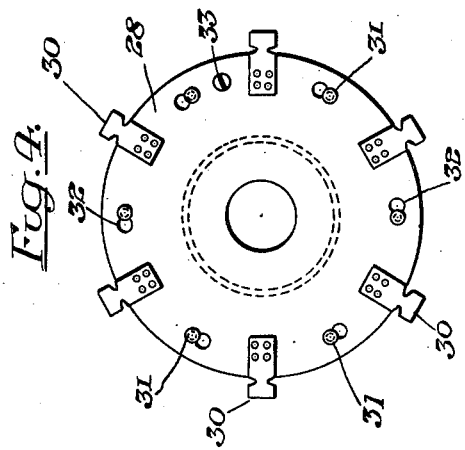
Inventor:
Carl O. Bruestle
by his Attorneys,
Darby & Darby Patented June 17, 1952

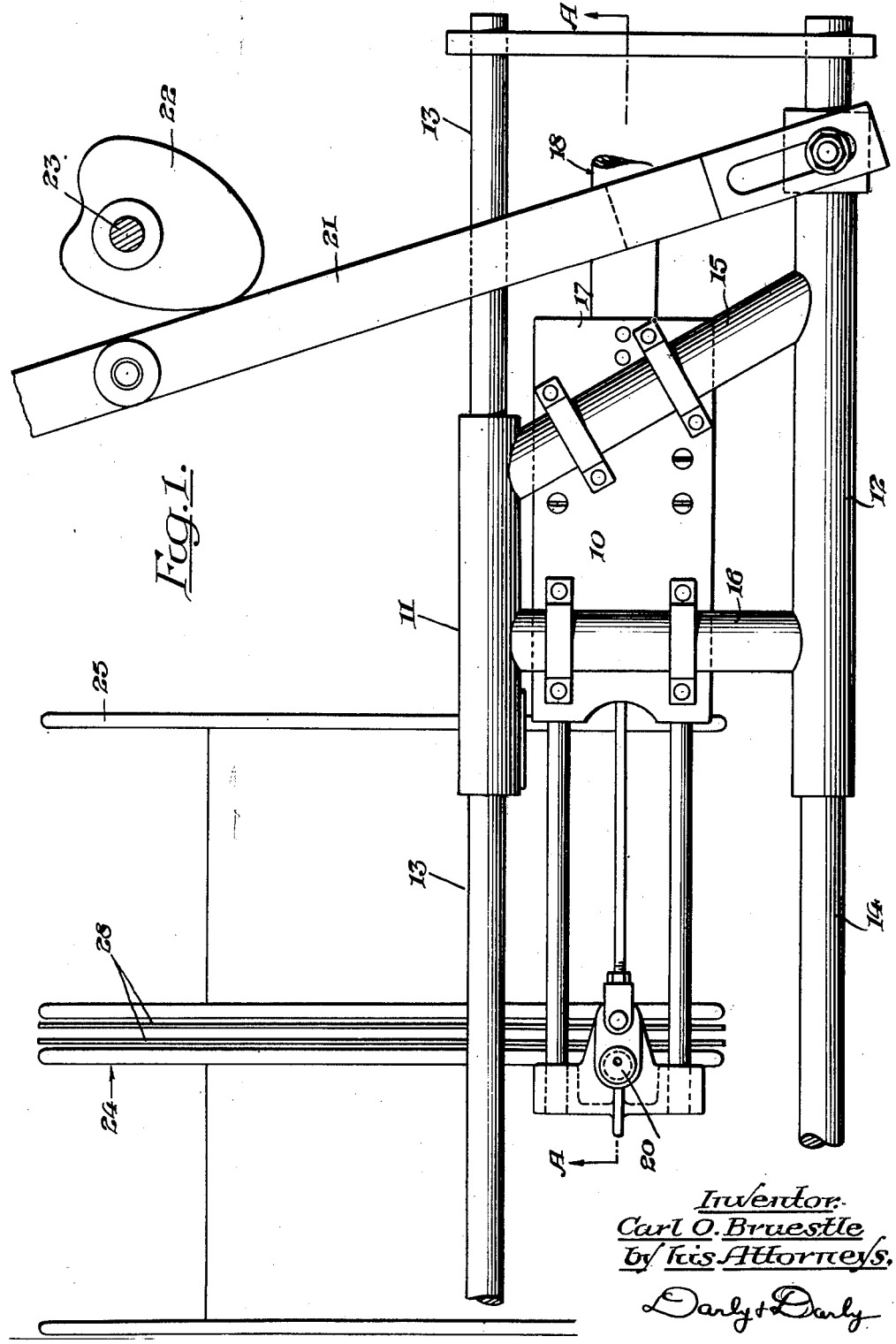

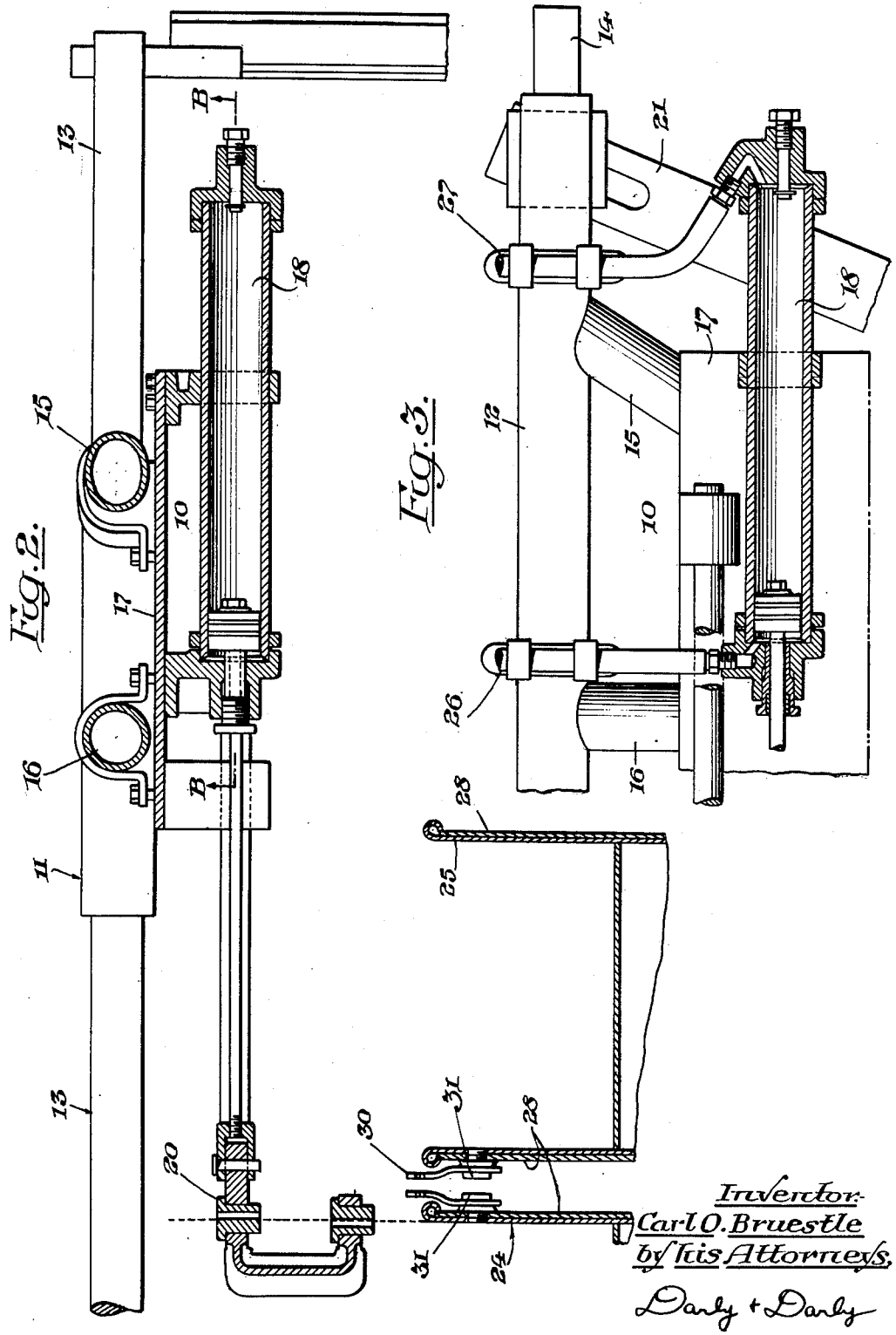

2,600,841

UNITED STATES PATENT OFFICE 2,600,841

WIRE CLAMP AND CUTTER FOR SPOOLING MACHINES

Carl O. Bruestle, Metuchen, N. J., assignor to Syncro Machine Company, Perth Amboy, N. J., a corporation of New Jersey Application June 25, 1949, Serial No. 101,444

4 Claims. (Cl. 242—19)

The present invention relates to spooling machines and particularly to a machine for spooling wire. More particularly still the invention relates to a machine in which wire is wound on successive spools without the necessity of stopping the machine in order to transfer the winding from one spool to another.

In other words, the wire is wound upon a spool at one station and, upon that spool being filled, the wire is automatically transferred to another station and wound upon an empty spool. While the latter winding proceeds the filled spool is removed and an empty one substituted therefor and when the second spool is filled the wire end is again transferred to its original station and the now empty spool thereat is filled. The transfer is, of course, effected automatically.

In general, the machine of this invention is an improvement upon that shown in Cook Patent 2,424,021 issued July 15, 1947. The machine of the Cook patent was subject to serious disadvantages arising particularly from the fact that at the time of transfer dependence was placed upon the looping of the wire upon itself to anchor the initial turns upon the empty spool. Frequently this looping action did not occur or occurred improperly with the result that the machine failed to wind properly and, therefore, had to be stopped and the spool unwound and restarted by hand until again properly anchored on the spool. Furthermore, and of greater importance, the loose wire end left on the finished spool is caused to fly out under centrifugal force as soon as the strand has been properly transferred to a new spool. This wire end makes contact with various of the machine parts and breaks up into small pieces which, travelling at high rates of speed, present a great hazard to the operator and others in the vicinity of the machine. To avoid this it became necessary to encase the machine with screening or glass in order to eliminate the hazard attendant upon this operation.

It is an object of my invention to provide a wire spooling machine of the type of the Cook patent mentioned but without the disadvantages thereof which have been recited.

It is another object of my invention to so modify the manner of anchoring the initial course or courses of wire to the spool as to assure that there will be no defective spools and no broken pieces of wire forcibly propelled from the machine.

It is another object of my invention to simplify the construction of such a wire spooling machine as well as the controls therefor.

Other objects and features of my invention will become apparent from the following description taken in connection with the annexed drawings in which—

Figure 1 is a fragmentary top plan view of the machine of my invention showing particularly the mechanism for transferring the wire from one spool to another;

Figure 2 is a cross-sectional view taken on the plane of the line A—A of Figure 1 and showing the pneumatic cylinder which is a primary element in the control of the wire position;

Figure 3 is a cross-sectional view taken on the plane of the line B—B of Figure 2 showing particularly the connections to the pneumatic cylinder;

Figure 4 is a side elevation showing a ring, carrying cutting and clamping members, which ring is applied to the wire reels or spools and forms a vital part of the operating method and mechanism of this invention;

Figure 5 is a schematic diagram showing two spools located as in the machine of Figure 1, illustrating the condition when one spool is filled and the wire is about to be transferred to the empty spool;

Figure 6 is a schematic view similar to that of Figure 5 but illustrating the condition when the wire guiding member has been operated and the wire has been led into position to be fed onto the empty spool;

Figure 7 is a view similar to Figures 5 and 6 and shows the condition as the wire guide and clamping lugs on the flanges of the two spools approach each other due to the difference of rotational speeds of the spool;

Figure 8 is a side elevation of the two spools of Figure 7 showing the approach of the lugs to each other;

Figure 9 is a view similar to Figures 5 through 8 but illustrates the positions of the wire clamping and guiding lugs after one has passed the other causing the wire to be looped between them in position to be cut at one of the lugs and the ends thereof to be held by each lug in position so that it cannot be disengaged; and Figure 10 is a side elevation of the spools of Figure 9 illustrating the path of the wire from the full spool to the clamping lug thereon, thence to the clamping lug on the empty spool and thence around the empty spool showing the initial turns about that spool.

As has been stated above, my device is an improvement upon that shown in the Cook Patent 2,424,021. In that patent the peripheral speed of the empty spool was equalized with that of the full spool by utilization of a belt arrangement driven by contact with the wire on the full spool. I have simplified that device and have eliminated the belt control of the peripheral speed since this has proven to be, from a practical standpoint, an unnecessary complication. I have also slightly modified the mode of shifting from a full spool to an empty spool. In the Cook patent a wire guide was caused to traverse a path which extended from flange to flange of a single spool and acted to distribute the wire in layers, this device being driven by a cam and lever arrangement. When it was desired to traverse from one spool to another, the lever was shifted about its pivot point to cause the distributing head to move through a distance equivalent to the distance from the outer flange on one spool to the outer flange on the other. In my device, I utilize the same cam and lever arrangement but instead of shifting the lever about its pivot point to shift the wire distribution from one spool to another, I mount a pneumatic cylinder on a carriage driven by the lever and move only the wire guide or distributing head with respect to the carriage.

The major modification of the Cook patent, however, resides in the provision of anchor and clamping lugs on the flanges of the reels which permits of an entirely different mode of operation of the machine and assures that the initial turns of wire will be properly anchored to the reel or spool and likewise assures that the wire will not break and that, therefore, no pieces of wire will be thrown off and constitute a hazard to those in the vicinity of the machine.

Referring now to the drawings, it will be seen that there is provided a carriage generally designated 10 (Figure 1) which carriage comprises two tubular members 11 and 12 slidably mounted upon the rods 13 and 14. This carriage 19 is the equivalent of the sleeve 117 of Figure 2 of the Cook patent but is a member of considerably greater strength and rigidity than is that sleeve. The two tubes 11 and 12 are joined by members 15 and 16, which tubes in turn have clamped thereto a plate 17. To the underside of this plate is fastened a pneumatic cylinder 18, the piston rod of which extends to the left as seen in Figures 2 and 3 and carries at its outer end a wire guide or distributor generally designated 20.

As in the Cook patent, the carriage 10 is caused to reciprocate on the guide rods 13 and 14 by means of a lever 21 and cooperating cam 22. The lever 21 corresponds to the lever 123 of Cook and the cam 22 corresponds to the cam 132 of Cook. It will be seen that as the shaft 23 on which cam 22 is mounted rotates, the carriage 19 is reciprocated and the distributing head 20 caused to move back and forth across the face of one of the two spools designated 24 and 25 in Figure 1. Further, it will be obvious that upon proper setting of suitable valves, the piston of the pneumatic cylinder 18 will be caused to move to one or the other of its extreme positions thus causing the distributing head to change its traverse from one spool to the other. It will thus be clear that merely by adjusting a suitable valve controlling pneumatic fluid supply to the flexible tubes 26 and 27 either spool or reel may be selected as the one upon which wire is to be wound in concentric layers.

As stated above, in the Cook patent a belt arrangement is utilized in order to equalize the peripheral speed of the empty spool with that of the full spool. I have found, however, that this arrangement is unnecessary since for a given wire size and a given spool size the relative angular speeds to produce equivalent peripheral speeds can readily be calculated. Therefore, in my machine there is no such belt arrangement but instead I simply throw a switch which inserts the proper resistance in the circuit of the driving motor for the empty spool so that its peripheral speed is equalized with that of a full spool immediately prior to the transfer of the wire from the full spool to the empty one. The sequence of operation will be hereinafter described in some detail but before proceeding to that description, the mode in which the wire transfer is effected will be discussed.

Referring now to Figure 4, it will be seen that I have provided a ring 28 which is provided with a plurality of lugs 30 fastened to the ring in any suitable manner. Each of the lugs 30 is provided with a V-shaped notch in each edge thereof, these notches being sharpened and adapted to cut and hold the severed end of a wire. The lugs 30 are provided with notches dependent upon the wire size which is to be spooled and, therefore, for convenience a number of rings are provided in accordance with the number of wire sizes which it is desired to spool. Additionally, of course, if a plurality of spool sizes are to be used rings 28 are provided in diameters approximating those of the flanges of the reels to be used. A ring 28 is mounted on one flange of each spool, as is indicated particularly in Figure 2. The rings 28 may be fastened to the spool flanges by any suitable means but should be readily detachable so that the operator may transfer such a ring from a full spool to an empty one in order that the number of rings required may be minimized. In the particular instance I have shown the rings as being provided with slotted openings which cooperate with headed buttons 31 (see Figure 2) positioned on the reel flange. It is desirable that in addition to the headed buttons and the cooperating slots 32 a headed screw be utilized to prevent any disengagement of the slots and buttons at the time when the wire is severed. A suitable location for such a bolt or screw is indicated in Figure 4 at 33.

Referring now to Figure 5, two reels are shown therein, the one at the left having been filled with wire, the showing being that immediately prior to the instant at which the piston of the pneumatic cylinder 18 is operated. At this time the two reels will be operating at the same peripheral speed which, of course, means that the angular speed of the reel at the left will be less than the angular speed of the reel at the right.

In its traverse from right to left the piston of the pneumatic cylinder carries with it the wire guide 20 and thus rapidly moves the wire from a position adjacent the lefthand flange of the lefthand reel 24 and carries it to a position immediately adjacent the lefthand flange of the reel 25, as is shown in Figure 6. In passing over the righthand flange in reel 24 and the lefthand flange in reel 25, the wire necessarily extends between lugs on each of these flanges, as shown in Figure 6. Consequently, as a result of the greater angular speed of reel 25, the lugs necessarily approach each other, as shown in Figure 7, and as the operation continues the particular lug considered in connection with the flange on reel 25 passes the one of reel 24 with the result that the wire is bent into the form shown in Figures 9 and 10. Shortly after this time the wire which is now firmly clamped in the V-shaped notch of the two lugs 30, one on reel 24 and one on reel 25, is severed by one or the other of the V-shaped notches.

After this severing has occurred, the full reel is braked to a stop, removed and an empty reel put in place and as the operation proceeds and the reel 25 is filled a similar operation takes place in the opposite direction to anchor the wire upon the now empty spool.

The exact sequence of operations desired may be procured in a number of different manners. In one form I have used a pair of timing relays, one connected in the circuit of each of two motors, the motors being constant speed motors and each driving one of the reel arbors through a magnetic slip clutch. When the main machine, that is, the machine producing the product which is to be reeled as, for example, a wire drawing machine, is started, one of the two motors is started and drives the corresponding reel at a speed which is greater than the speed of the main machine so that the actual speed of rotation of the reel is dependent upon the speed of the main machine, the clutch slipping to take up the difference. The timing device is set to operate after a predetermined time interval, which interval can be calculated from the dimensions of the package to be produced, the speed of the main machine, etc. At the end of the predetermined time interval the timer operates and initiates operation of the motor driving the empty reel to bring it up to the necessary angular speed corresponding to the peripheral speed at which the wire is discharged from the main machine. Since this peripheral linear speed is constant, it will be clear that the empty spool will now rotate at a higher angular speed than does the full reel. Mounted upon the arbor of the empty spool is a centrifugal switch which operates when this arbor reaches the pre-selected angular speed and conditions a circuit for operation. When the wire on the filled spool reaches a predetermined point in its traverse it completes the conditioned circuit which though a solenoid control valve or like device causes the piston in cylinder 18 to traverse the wire across the face of the full spool and into position adjacent the flange of the empty spool. After this has occurred the motor circuit of the full spool is deenergized either manually or automatically and a similar operation is performed, it being understood that each motor is provided with its own timer or timing relay and that at the time of shift of the wire from one spool to the other, the timing device is started in operation. Thus the two reels are alternately utilized and the wire wound thereupon.

While I have described a preferred embodiment of my invention, it will be understood that modifications thereof may be utilized within the scope and spirit of my invention. Consequently, I wish to be limited not by the foregoing description but, on the contrary, solely by the claims granted to me.

What is claimed is:
1. Means for clamping and cutting a wire extending from a full spool to an empty one in a continuous spooling machine in which wire fed thereto is alternately wound on two adjacent spools comprising, a ring detachably mounted on the flange of each spool adjacent the other spool, a plurality of lugs extending outwardly from each of the said rings, notches in said lugs on both side edges thereof and located substantially adjacent the peripheral edge of the corresponding flange, said notches being provided with cutting edges.

2. Means for clamping and cutting a wire extending from a full spool to an empty one in a continuous spooling machine in which wire fed thereto is alternately wound on two adjacent spools comprising, a ring detachably mounted on the flange of each spool adjacent the other spool, a plurality of lugs extending outwardly from each of the said rings, V-shaped notches in said lugs on both side edges thereof and located substantially adjacent the peripheral edge of the corresponding flange, the edges of said V-shaped notches being sharpened to provide cutting edges.

3. Means for clamping a wire extending from a full spool to an empty one in a continuous spooling machine in which wire fed thereto is alternately wound on one of first and second adjacent spools comprising, a ring detachably mounted on the flange of first and second spools adjacent to each other, a plurality of lugs extending radially outwardly from each of said rings, notches in said lugs on the side edges thereof faced in the direction of rotation and defining cutting sections substantially radial with the spool, said notches being substantially adjacent to the peripheral edge of the corresponding flange.

4. Means for clamping and cutting a wire extending from a full spool to an empty one in a continuous spooling machine in which wire fed thereto is alternately wound on each of first and second adjacent spools comprising, a ring detachably mounted on the flange of each spool adjacent to the other, a plurality of lugs extending radially outwardly from each of said rings, V-shaped notches in said lugs in the side edges thereof forming cutting sections oriented radially around the periphery of the spool, said notches being located substantially adjacent the peripheral edge of the corresponding flange.

CARL O. BRUESTLE.

REFERENCES CITED

The following references are of record in the file of this patent:

UNITED STATES PATENTS

| Number | Name | Date |
|---|---|---|
| 1,393,286 | Hosford | Oct. 11, 1921 |
| 1,988,437 | Brillhart | Jan. 22, 1935 |
| 2,234,976 | Muntwyler | Mar. 18, 1941 |
| 2,424,021 | Cook | July 15, 1947 |
| 2,454,241 | Wennerberg | Nov. 16, 1948 |
| 2,508,150 | Fennell | May 16, 1950 |